(12) United States Patent
Thorndike (10) Patent No.: US 9,250,066 B2
(45) Date of Patent: Feb. 2, 2016

(54) SYSTEM FOR MEASURING BASE EDGE BEVEL ANGLES AND CONDITIONS OF BASE FLATNESS FOR SKIS AND SNOWBOARDS

(71) Applicant: Charles Thorndike, Meredith, NH (US)

(72) Inventor: Charles Thorndike, Meredith, NH (US)

(*) Notice: Subject to any disclaimer, the term of this patent is extended or adjusted under 35 U.S.C. 154(b) by 0 days.

(21) Appl. No.: 14/221,497

(22) Filed: Mar. 21, 2014

(65) Prior Publication Data

US 2015/0268038 A1    Sep. 24, 2015

(51) Int. Cl.
*G01B 5/28* (2006.01)
*G01B 11/30* (2006.01)

(52) U.S. Cl.
CPC .................................. *G01B 11/30* (2013.01)

(58) Field of Classification Search
CPC ...... G01B 11/24; G01B 11/30; G01B 11/303; G01B 11/306
USPC ............................... 33/228, 274, 533
See application file for complete search history.

(56) References Cited

U.S. PATENT DOCUMENTS

| | | | | |
|---|---|---|---|---|
| 2,253,054 A * | 8/1941 | Tuttle | .................. | G01B 11/306 356/416 |
| 4,693,012 A * | 9/1987 | Cesna | .................... | G01B 5/285 33/533 |
| 5,289,267 A * | 2/1994 | Busch | .................... | G01B 11/24 356/243.4 |
| 5,339,534 A * | 8/1994 | Krayenhagen | ......... | G01B 5/285 33/533 |
| 7,298,499 B2 * | 11/2007 | Fournier | ................ | G01B 11/25 356/237.1 |
| 8,151,476 B2 * | 4/2012 | Kildevaeld | ........... | G01B 11/303 33/348.2 |
| 8,443,524 B2 * | 5/2013 | Kildevaeld | ............... | G01C 9/24 33/348.2 |
| 8,459,073 B2 * | 6/2013 | Isei | ........................ | B21C 51/00 72/11.2 |
| 9,003,846 B2 * | 4/2015 | Isei | ........................ | B21C 51/00 72/11.2 |
| 9,086,384 B2 * | 7/2015 | Ohto | ....................... | C03B 25/08 |

* cited by examiner

*Primary Examiner* — G. Bradley Bennett
(74) *Attorney, Agent, or Firm* — Thomas T. Aquilla; Aquilla Patents & Marks PLLC

(57) ABSTRACT

A system for measuring flatness and base edge bevel of skis or snowboards includes a true bar calibrated for straightness having a sharp micro-edge for contacting the ski or snowboard, a light source arranged on one side of the true bar providing a line of light between the true bar and the base of the ski or board, a tool carrier for stabilizing and raising or lowering the true bar, an edge bevel gauge arranged on the base of the ski or board under the true bar for measuring the angle of the base edge bevel, and a mechanism for observing the line of light from the side of the true bar opposite the light source. The system provides reliable means for measuring and interpreting the surface dimensions and other physical properties of skis and boards and the causes and effects of changes to the running surfaces.

15 Claims, 12 Drawing Sheets

Base Edge Bevel Profile Record

Measuring Points: 1, 2, 3, 4, 5, 6, 7, 8

Looking at the Base(s):
Left | Right | Left | Right (Ski or Snowboard)

History: New
Days or seasons

Notes:
Aprox distance between points of measure:
This can be personal preference and more or less points depending on length.
20
__Centermeters

Mark your skies:
S 1 & S 2 or,
1 & #2 or, A & B
(Just so you can tell them apart)

Your Remarks:

SYSTEM FOR MEASURING BASE EDGE BEVEL ANGLES AND CONDITIONS OF BASE FLATNESS FOR SKIS AND SNOWBOARDS

BACKGROUND OF THE INVENTION

1. Field of the Invention

The invention generally pertains to the field of measuring a planar surface and its edges. More particularly, the invention pertains to a method and apparatus for measuring base edge bevel angles and base flatness of a ski or snowboard for increased performance.

2. Description of Related Art

Down hill snow skis and snowboards are made from a wide variety of materials, including wood, fiberglass, plastics, resins, composites and the like. These materials generally are put into molds, then glued, heated and pressed together. The result is a ski or snowboard with a gliding surface (a base against the snow) that is parallel with the top of the ski. More specifically, the base is manufactured to be parallel to the binding plate area on top of the ski or snowboard.

The bases of snowboards and skis typically are made from a hard plastic material, such as Ultra-High-Molecular-Weight Polyethylene (UHMWPE or sometimes shortened to UHMW), also known as high-modulus polyethylene (HMPE) or high-performance polyethylene (HPPE). This dense, extremely durable, abrasion-resistant thermoplastic material has low friction properties, is easily repairable and openly accepts wax, in order to improve its gliding efficiency in a variety of snow conditions. UHMW ski and snowboard base materials generally are of two types, extruded or sintered, and grades vary slightly in their density and additives, but all are capable of absorbing wax and differ from regular UHMW, in that they are specially treated for bonding with epoxy resin. "P-tex", "Isospeed", and "Durasurf" are common brand names in the industry, and all are high quality parts, used by most major manufacturers. Examples of some known high performance ski base materials are disclosed in U.S. Pat. Nos. 5,189,130 and 5,069,976.

The bases of most modern down hill skis and snowboards also have two metal edges on the lower surface, which typically run the length of both lower edges of the ski to aid in griping the snow and turning. In order to obtain the benefits of using well-tuned skis, which generally is important to all skiers and riders, but particularly to proficient downhill skiers, racers and riders, the edges of the skis must be maintained in a smooth, sharp condition to provide top performance characteristics and consistent edge bite, especially on icy or hard snow surfaces. More particularly, the base must be planed or ground true or flat and both the side and bottom of the metal edges must be sharpened regularly. Beveling of the metal edges also is commonly performed, while sharpening. By beveling the edges, changes in the drag and turning characteristics of the ski or board can be greatly affected. This process of sharpening and beveling the edges to achieve specific performance characteristics generally is known as tuning the ski. Although waxing really is a separate art, waxing also can be considered part of ski tuning, particularly as applied to increased performance.

Ski-owners can tune their own skis, if suitable tools and the necessary skill for doing so are available, and many racers prefer to tune their skis and snowboards in their own shop or even in the field. Accordingly, a wide variety of devices have been developed for sharpening ski edges, which generally fall into two categories: manual sharpeners and motorized sharpeners. Many different types of manual or hand-held ski sharpening devices are known, but these generally produce variable results, particularly for those seeking top performance. Examples of a variety of known hand-held ski sharpening devices are disclosed in U.S. Pat. Nos. 4,721,020; 4,509,297; 4,280,378; 4,089,076; 4,060,013; 3,934,287; 3,899,942 and 3,875,825.

Manual sharpeners tend to include a file with a file holder to maintain file or cutting tool alignment. There are significant problems with such manual devices. Specifically, these units are hard to keep aligned, removal of metal is uneven and because of the size of the file teeth, the file generally needs to straddle both sides of the ski, leading to interference with the base material and uneven filing of the bottom edge. Another problem with manual sharpeners is their typical inability to adjust the angle on the file, leaving the user with right angles (a zero degree bevel) as the only choice, or at best a single choice of bevel angle. Because many of these manual sharpeners require a certain amount of skill and are difficult to use, they generally produce variable results.

The majority of motorized sharpeners are large floor or bench-type models, designed primarily for use in professional ski shops. Examples of known motorized ski sharpening devices are disclosed in U.S. Pat. Nos. 6,702,656; 5,136,816 and 4,679,356. While there is at least one small hand-held motorized unit disclosed in the art, it suffers from difficulties in keeping the sanding disc at a proper angle, since the motor, motor shaft and sanding disc are held parallel to the ski edge during use. The weight of the motor that is not supported in this configuration makes balancing the system difficult. A further problem with this design is the tendency for the sanding disc to "run-away" from the user if not held tightly.

Professional ski shops typically are considered the best place to take skis for sharpening the ski edges. These shops can afford the large motorized sharpening machines that hold the skis firmly in place and quickly sharpen the whole ski. This is conventionally done by skilled personnel carrying out ski sharpening services in association with the sale of skis and ancillary skiing equipment. However, the time and cost of taking the skis to a professional shop discourages many people from doing such sharpening as often as it should be done for optimal performance. Moreover, if the machine is not properly calibrated, or if the operator is inexperienced or unskilled, even the best automated equipment cannot tune a ski properly for high performance.

Among other important observations, Applicant has discovered that, if the base of the ski is not planed true prior to setting base edge bevels, the left and right edges may end up being asymmetric. The base is the one surface from which most measurements are taken and it must be flat, relative to the binding plate/area. To Applicant's knowledge, the prior art fails to recognize, teach or suggest this problem and the currently available equipment does not adequately resolve the problem. Applicant has therefore created an improved system for accurately measuring base flatness and edge bevel angles, which overcomes the problems associated with the prior art. This system also helps the service shop technician or home technician make adjustment in the use of his or her own tools, techniques, and methods to improve the accuracy of tuning results.

SUMMARY OF THE INVENTION

The present invention provides an improved system for accurately measuring the base flatness and edge bevel of a ski or snowboard for increased performance.

One embodiment provides a system for measuring base flatness and edge bevel of skis or snowboards, including a true bar having a durable, straight edge, calibrated for straightness and having a sharp micro-edge for contacting the ski or snowboard, a light source arranged on one side of the true bar for providing a line of light between the true bar micro-edge and the base of the ski or board, a tool carrier for stabilizing and raising or lowering the true bar, a precision edge bevel gauge bar arranged on the base of the ski or board under the true bar for measuring the angle of the base edge bevel, and a mechanism for observing the line of light from the side of the true bar opposite the light source. The system provides reliable means for measuring and interpreting the surface dimensions and other physical properties of skis and boards and the causes and effects of changes to the running surfaces.

The system further provides methods for accurately measuring the flatness of the base and the base edge bevel of a ski or snowboard, as described in further detail below. These and other features and advantages will become readily apparent from the following Detailed Description, which should be read in conjunction with the accompanying drawing figures.

BRIEF DESCRIPTION OF THE DRAWING

Reference is now made to the accompanying drawings. The drawings are not necessarily to scale, with the emphasis instead placed upon the principles of the present invention. Additionally, each of the embodiments depicted herein are but one of a number of possible arrangements, utilizing the fundamental concepts of the present invention. The drawings are briefly described as follows:

FIG. 12A represents one side edge and FIG. 12B shows the other side edge.

DETAILED DESCRIPTION

The following description relates to certain preferred embodiments of methods and apparatus in accordance with the present invention. Numerous variations and modifications, other than those specifically indicated will be readily apparent to those of sufficient skill in the field. In addition, certain terms are used throughout the discussion in order to provide a convenient frame of reference with regard to the accompanying drawings, such as "top" "bottom", "interior", "distal", and the like. These terms are not intended to be specifically limiting of the invention, except where so indicated in the claims.

DEFINITIONS

Ski and snowboard nomenclature is relatively simple. Examining the ski from front to back along the direction of travel, the front of the ski (typically pointed or rounded) is the "tip", the middle is the "waist" and the rear (typically flat) is the "tail". All skis have four basic measures that define their basic performance: length, width, sidecut and camber. These and other terms are defined herein for the purpose of clearly describing the state of the art and the intended meaning of the terms as used throughout the disclosure.

Base refers to the plastic surface of the bottom of a ski or board, typically comprising Ultra-High-Molecular-Weight Polyethylene (UHMWPE or sometimes shortened to UHMW), also known as high-modulus polyethylene (HMPE) or high-performance polyethylene (HPPE). It is specially formulated to accept or absorb waxes for different temperatures and moisture conditions, resulting in bases that, when waxed, reduce friction when in motion or gliding on varying snow surface conditions. Bases may be extruded (heated and drawn) or sintered (pressed). P-tex, Isospeed, and Durasurf are common brand names in the industry.

Base flatness refers to the flatness of base and the face of the base edge of the ski, both from side to side and tip to tail, contact point to contact point. 1) The first planer surface of flatness from side to side, considers the plastic base and metal edge as one plane. 2) The second planer surface also considers the plastic base surface and the face of the base edge, from the tip contact point to the tail contact point.

Base edge bevel refers to the metal base edge face/planar surface. It can also be inclusive of some portion of the plastic base, whether the base is convex or concave. The term "base bevel" or "base edge bevel" is differentiated from "side edge bevel" or "side edge" for the purposes of using the measuring system and precision edge bevel gauge described herein, and with regard to general discussion about bevels. Alternative terms commonly used include: "base edge" or "edge base", both meaning part of the bottom/base of the ski or board. Either edge, whether side edge or base edge, has a "face". Thus: "Face" of the base edge or "Face" of the side edge.

Camber is the shape of the edge of the ski as viewed from one side or the other. Skis are traditionally designed so the tips and tails are naturally pressed down, and if laid on a flat surface, the waist will be in the air. Without camber, when the skier's weight is applied at the waist, the weight will be distributed on the surface closest to the foot, diminishing along the length. Camber presses the tips and tails into the snow, extending the surface area bearing the skier's weight, and thereby increasing the amount of edge in contact with the surface. The technique was first introduced by ski makers in Telemark, Norway, and remained largely unchanged through the 20th century. In 2002, skier Shane McConkey led development of the Volant Spatula, an alpine ski developed for skiing deep powder snow. The Spatula featured "reverse camber" with the tips and tails rising above the waist, in an effort to improve the ski's ability to float on the snow. It was quickly realized that the design was superior in many snow conditions, and as was the case with radical sidecuts, modern alpine skis generally feature some sort of "rocker" design today. This is often subtle, with natural camber at the waist, and rocker at the tip and tail. Skis also differ in more minor ways to address certain niche roles. For instance, mogul skis are much softer to absorb shocks, and powder skis are much wider to provide more float.

Contact points are the two points of a ski or board that touch the snow, when the ski or board is resting (with no weight) on a flat snow surface.

Face refers to the base or side edge surface of the ski or board.

Gauge refers to a tool with preset parameters that may be proven in mathematical calculations. Because a gauge is a tool that is made using other tools, it is subject to the accuracy and precision of those tools and its precision is sometimes referred to by a dimension, plus or minus the desired measure.

Shovel refers to the round portion of a ski or board that reduces the potential of a ski or board to dig into the snow over which it moves.

Side edge refers to that portion of the base surface of a ski or board that is generally perpendicular to the base surface of the ski. The side edge typically is honed to create an acute angle (bevel) by honing or cutting away metal with tools (e.g., guides, files and/or abrasives).

Side edge bevel is that angle, (other than perpendicular) that is cut to create a 90 degree angle to the base, or less than 90 degrees (acute) with a dimension of degrees usually between 0 degree and 6-7 degrees.

Sidecut is the shape of the edge of the ski as viewed from the top or bottom. Alpine skis are wider at the tip and tail than they are at the waist; when rotated onto their edge, known as "edging", this causes the ski to bend into a curved shape and allows them to "carve" a turn. Cross-country techniques use different styles of turns; edging is not as important, and these skis generally have little sidecut. For many years, alpine skis were shaped similarly to cross-country skis, simply shorter and wider, but the Elan SCX introduced a radical sidecut design that dramatically improved performance. Other companies quickly followed suit, and since then, "shaped" skis have dominated alpine ski design.

Structure refers to surface finish(s) of the base that may be applied by stone grinding. It is known that, as a ski or board moves over the snow, groves in the otherwise smooth bottom surface of the ski break the partial vacuum that is created between a ski or board's base and water in the snow, thus improving sliding/gliding characteristics. This effect is described by Dag Anders Moldestad, in his doctoral thesis at the Department of Structural Engineering, Norwegian University of Science & Technology, N-7491 Trondheim, Norway, entitled: Some Aspects of Ski Base Sliding Friction and Ski Base Structure, December, 1999.

Tail is the part of the ski that is the rear end of ski or board. It is the following geometry of the ski or board.

Tip is the very end of the ski or board that is located at the shovel end and also may be referred to as the front of the ski.

Tolerance is that measure that is close to the exact desired or defined dimension. It is frequently expressed as "plus" or "minus" the desired dimension and is suggestive of a resultant measure that is of acceptable accuracy, within a measured range above and below the standard.

True bar refers to a straightedge tool with either a "V" or single side "V" knife-like edge. In the preferred embodiment, the micro-edge is accurate to 2-3/10,000 of an inch and has become a standard for checking the base flatness and bevels of a ski or board. When a true bar or straightedge (the sharp edge) is placed on the base surface of a ski or board, the residual light from one side can be observed on the other side. The residual light provides an image of various amounts of light that escape between the edge and base of ski or board. This light illustrates surface contour differences along the line of the straightedge that can be quantified.

Tuning is the sharpening or honing of the face surfaces of a ski or board metal edge. Tuning removes metal material from an edge. Tuning may be done by hand or machine. It is typically finished by hand, with files and/or abrasives.

Measuring Alpine Ski and Snowboard Profiles

The inventor discloses herein methods and apparatus for measuring the base flatness and base edge bevel of a ski or snowboard for increased performance. The system provides reliable means for measuring and interpreting the surface dimensions and other physical properties of skis and boards, and the causes and effects of changes to their running surfaces.

Standards for running surfaces of skis and boards are initially designed and engineered at the point of manufacture and subsequently are fine-tuned by shop technicians and home tuners, as the equipment is utilized, in accordance with the needs of skiers racers and riders. Service shop and home technicians in particular, therefore need a way to measure base flatness and base edge bevel angles of their equipment for top performance. Base edge bevel especially is critical to all levels of skiing and snowboarding performance.

Typically, the bases of skis and boards are tuned in a shop by technicians using modern automated machines. However, the inventor has discovered that even the best machines cannot be relied on, without confirming the final dimensions. The ski shop equipment must be adjusted, operated and maintained properly, and the finished bases still require final measuring and fine-tuning for accuracy. Therefore, even machine-finished bases will benefit from application of the methods and apparatus disclosed herein.

The measuring system disclosed herein helps the user to measure and interpret the changes in characteristics and physical dimensions of skis and boards affected by hand and/or machine tuning. The system provides reliable means for measuring "base edge bevel" and evaluating and quantifying the results of filing or grinding to set a "base edge bevel", as well as the structure of the plastic base for "flatness" of the running bases of both skis and snowboards. The system further provides for interpreting the information and data obtained and understanding the quality of various ways a base edge bevel may be set, when skis and boards are tuned. Thus, when setting the final bevel, by cutting the base edge, whether done by hand with a fine file or stone and/or by machine or other means, it can be measured and quantified as a basis for future tuning.

One embodiment includes a true bar with a durable straightedge, preferably made from tool steel, calibrated for straightness and having a sharp micro-edge for contacting the ski or snowboard. A light source, such as LEDs or any sufficiently bright light, is arranged on one side of the true bar for providing a line of light between the true bar micro-edge and the base of the ski or board. A tool carrier stabilizes and allows raising or lowering of the true bar. A precision edge bevel gauge is arranged on the base of the ski or board under the true bar for measuring the angle of the base edge bevel, and means for observing the line of light (such as a 4x mirror or other magnification device) is arranged on the side of the true bar opposite the light source. A record is used for collecting data and creating a map of the base edge bevel profile of a ski or snowboard.

Figure 6:
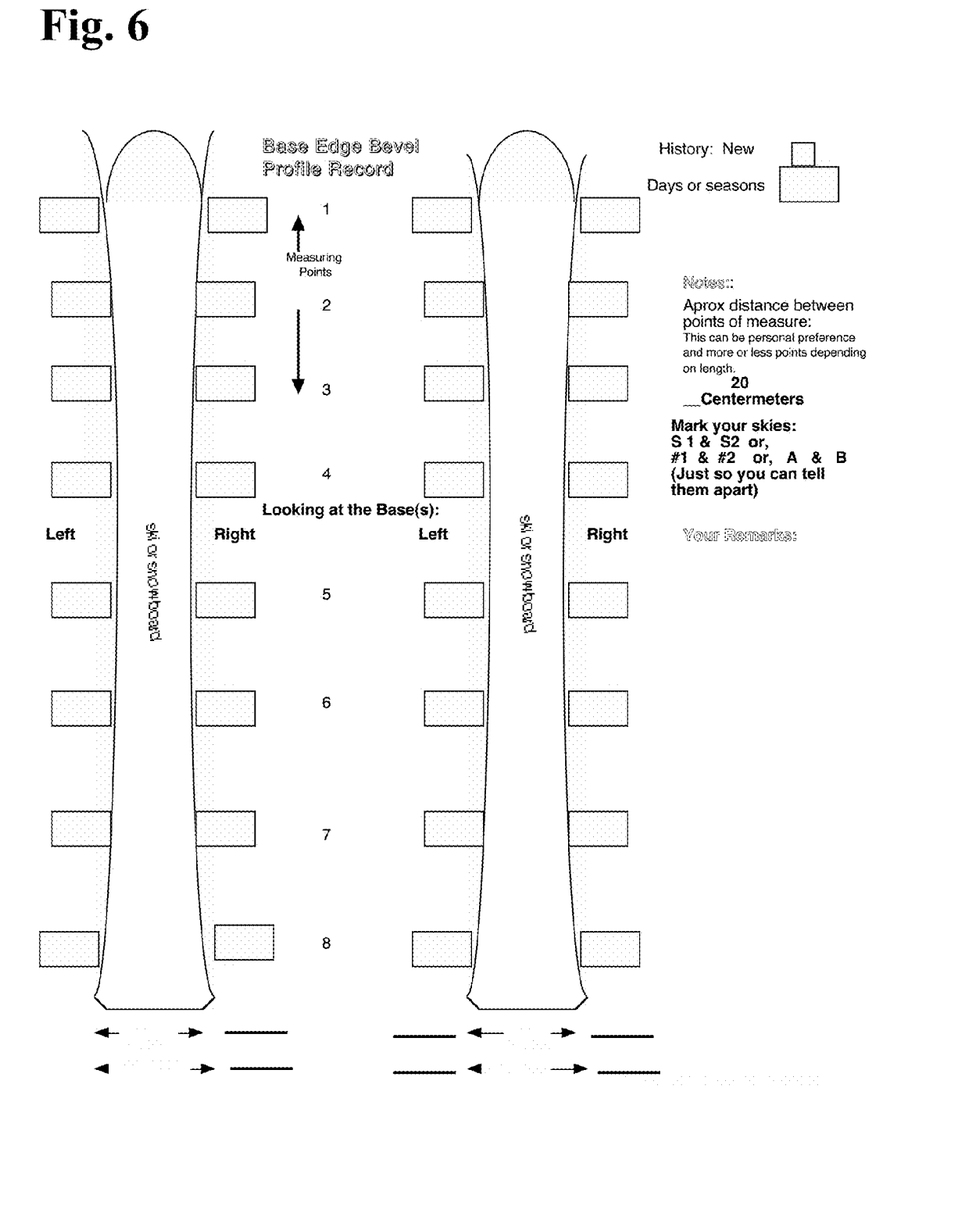
FIG. 6 shows a form for collecting data and mapping a base edge bevel profile of a ski or snowboard in accordance with the invention.

A map of these conditions can be developed to illustrate the condition of the base and help to understand the meaning of what is observed. Recording or mapping observations and conditions is important. For example, taking measurements every 10-20 cm along the edge of a ski provides a range of values over the length of an edge, called a histogram. Sections of the edges can be compared and also to other sections of the edge and other ski edges. FIG. 6 shows a histogram form for collecting data and creating a map of the base edge bevel profile of a ski or snowboard. The more a user works with the system, the better they will understand what profiles are best and the more a technician will understand the use of shop equipment and tools.

Precision Edge Bevel Instrument

Referring now to FIGS. 1-4, a preferred embodiment of a system for measuring base edge bevel angles and base flatness of a ski or snowboard is shown. FIGS. 1A and 1B show a precision edge bevel gauge assembly 700 and viewing assembly 600 arranged on a snowboard or ski base 210 in accordance with the methods described herein. The apparatus includes a light source 702, which can be bright ambient light or, more preferably, a lamp or other bright light source, arranged at one side of a true bar 705 having a precision micro-edge 725, and observed on the other side. The preferred light source for the instrument is a small battery powered LED array. The micro-edge of the true bar should be made from tool steel and optimally is accurate to within $\frac{1}{10,000}$ of an inch of straight. The carrier base and clamp assemblies preferably comprise cast aluminum machined to close specifications to make all parts function accurately.

Figure 1A:
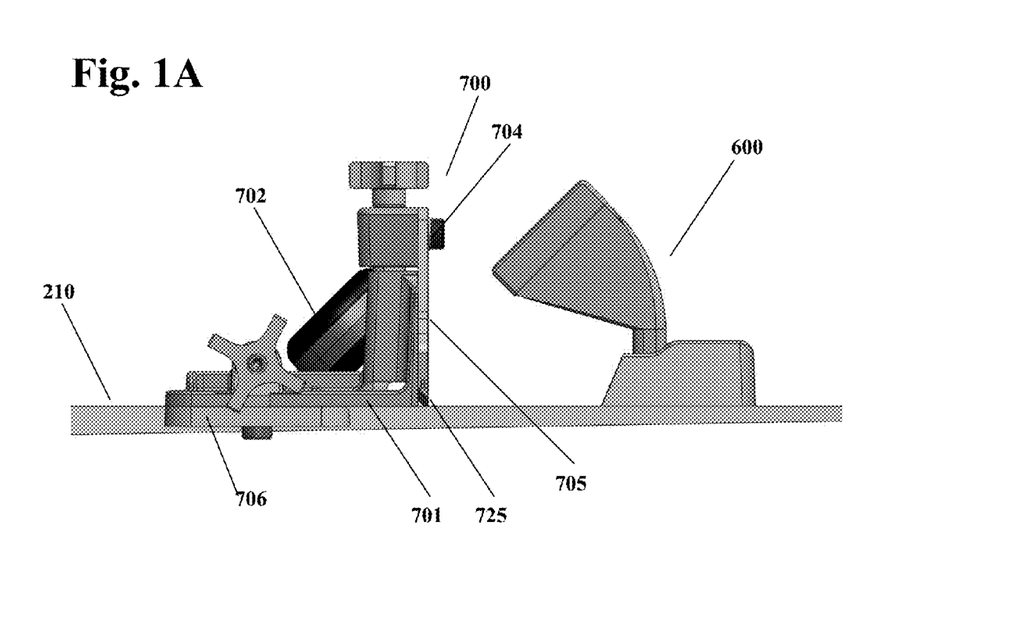
FIGS. 1A-1B show side and perspective views of a preferred embodiment of a system for measuring and tuning the base and edge bevel of a ski or snowboard in accordance with the invention.
Figure 1B:
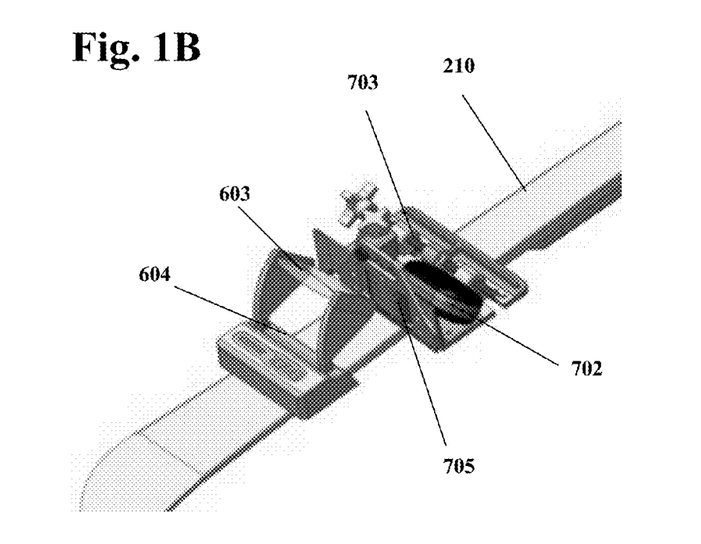
Figure 2A:
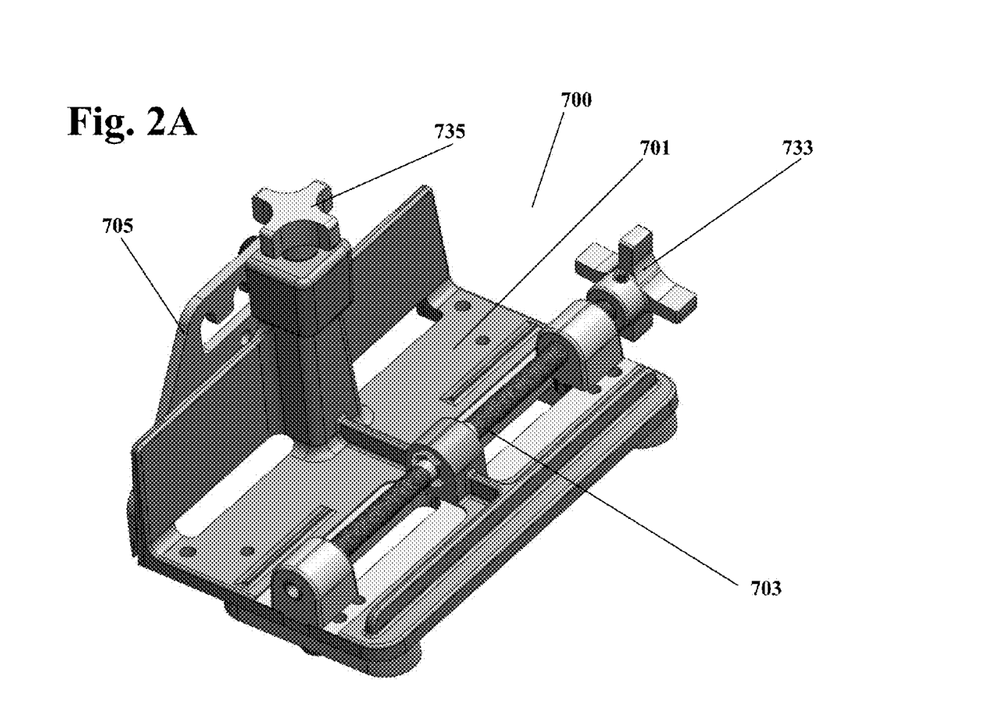
FIGS. 2A-2B show a preferred embodiment of a precision edge bevel gauge assembly for measuring and tuning the base and edge bevel of a ski or snowboard in accordance with the invention.
Figure 2B:
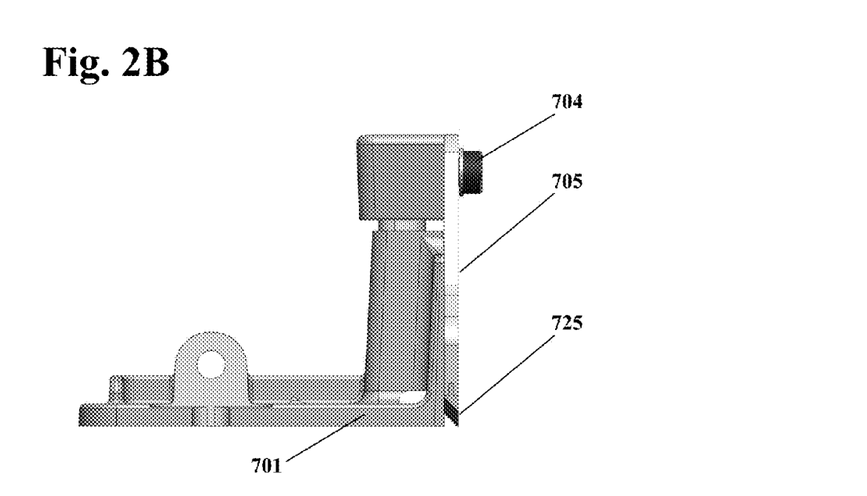
Figure 5:
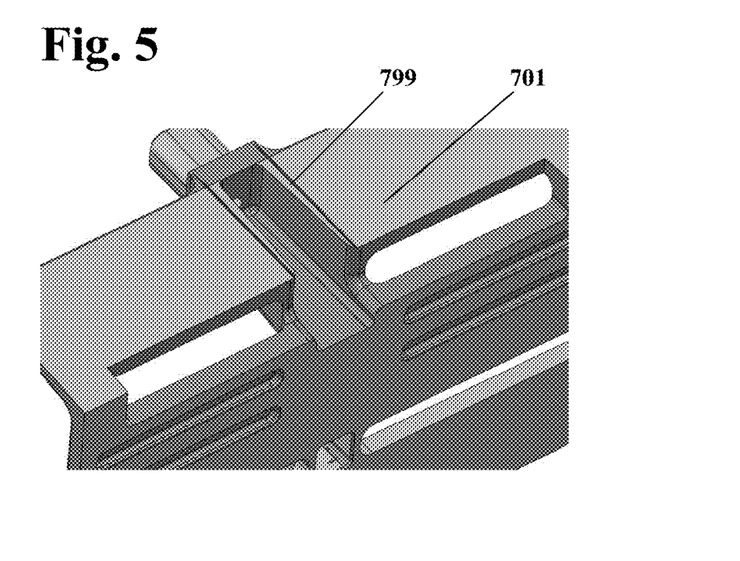
FIG. 5 shows a detailed view of a preferred embodiment of a carrier base for a precision edge bevel gauge assembly in accordance with the invention.

FIGS. 2A-2B show a more detailed view of a precision edge bevel gauge assembly 700, which includes a carrier base angle plate 701 that is clamped to the planar surface of the ski base 210. The micro-edge 725 of true bar 720 pivots on a shoulder pin 704, threaded into the carrier base angle plate. As shown in FIG. 5, two vertical lines 799 on the carrier base angle plate 701 are arranged such that they can be seen through either of two machined vertical oval slots 755 on the true bar 705.

Figure 4:
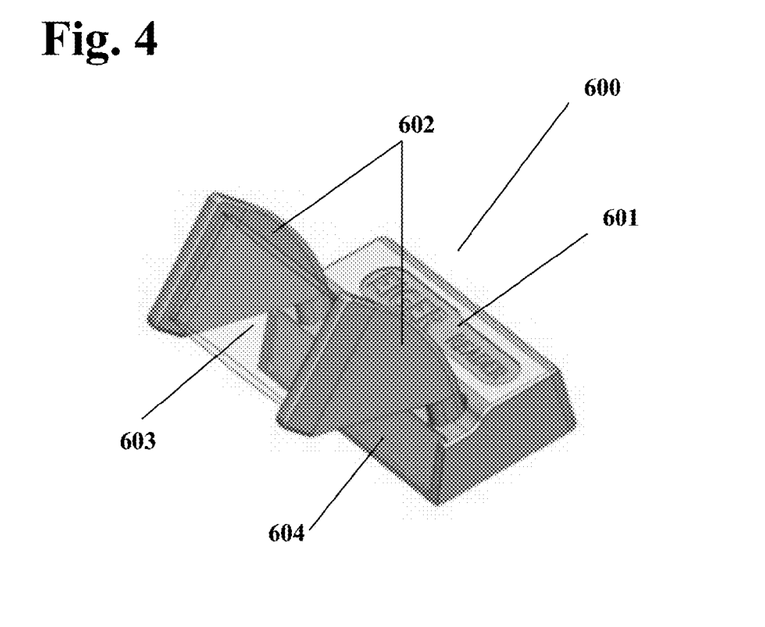
FIG. 4 shows a detailed view of a preferred embodiment of a viewing assembly for a system for measuring and tuning the base and edge bevel of a ski or snowboard in accordance with the invention.

FIG. 4 shows a more detailed view of a viewing assembly 600, which includes a base 601 and two brackets 602, which hold a magnifier 603. A reflector 604, such as a mirror, is affixed to the front of viewer base 601, reflecting towards the viewer. The magnifier preferably is a 4× glass (2×4") and must be wide enough to see the base planar surface 210 from edge to edge.

As light passes between the ski or board base 210 and the micro-edge of the true bar, a line of light (LOL) 115 can be observed. The line of light is residual or refracted light, which can be seen in an inspection mirror 604 on the other side. The magnified image of the line of light in the mirror helps to judge consistency of flatness, structure, concavity, convexity and other surface features of bumps or divots, due to machine grinding or wear from equipment use.

Figure 3A:
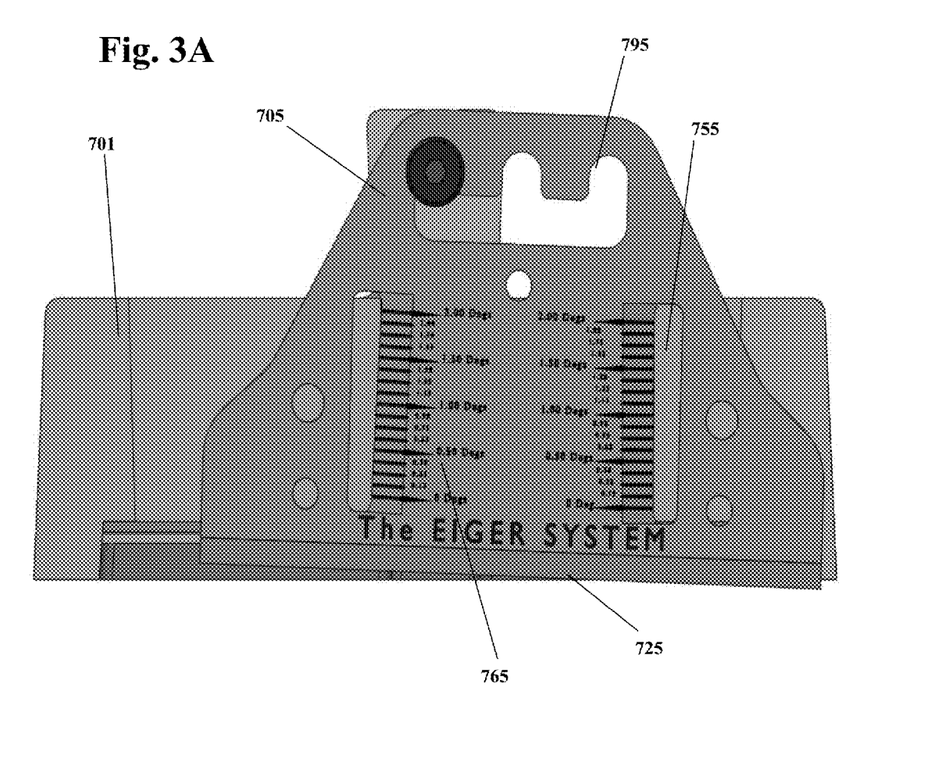
FIGS. 3A-3B show detailed views of a preferred embodiment of a degree scale for a precision edge bevel gauge assembly in accordance with the invention.
Figure 3B:
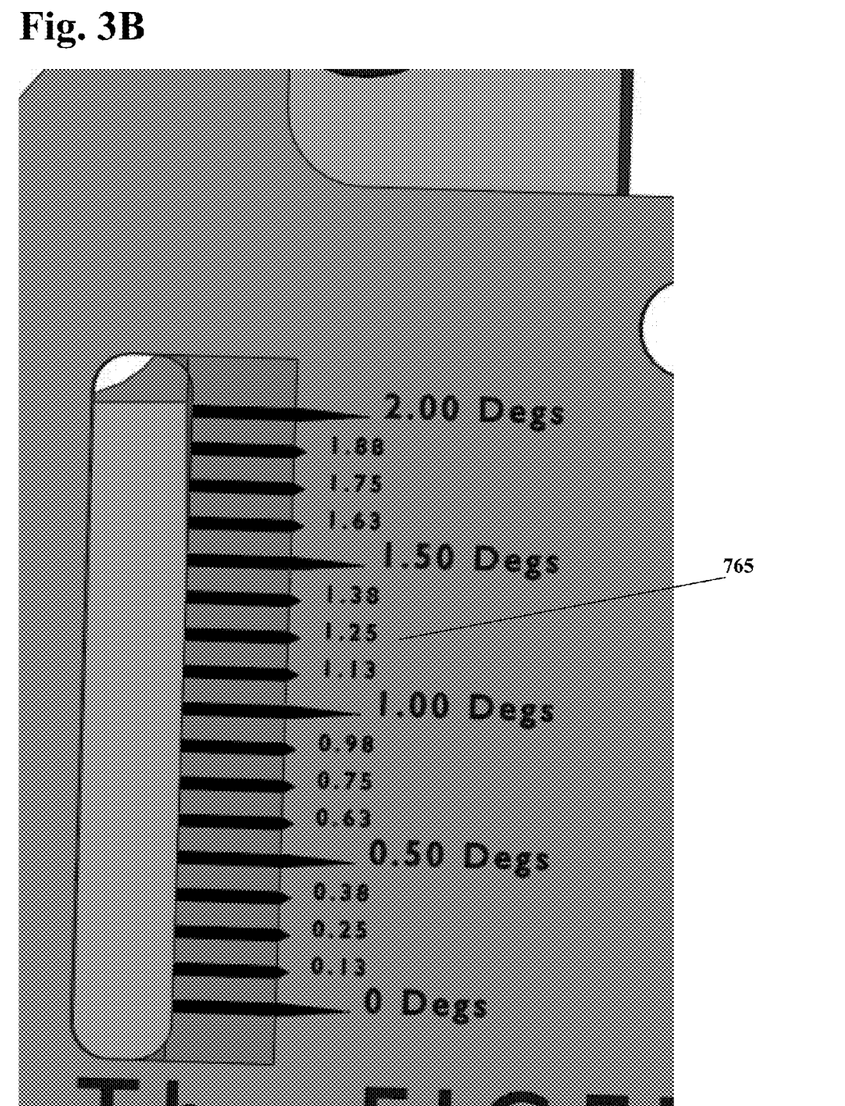

As shown in FIGS. 3A-3B, the true bar 705 has two vertical oval slots 755 machined into the center area of the true bar. There are two fractional angle scales 765 at the inside edge of each of these slots that read in fractions of ¼°, from 0 to 2 degrees. Three positioning notches 795 are used in conjunction with the adjusting knob and each notch is a pivot point. The mid position or notch #1 is used to check and measure flatness variations. Notch #2 is used when measuring the base edge bevel on one side of the ski base (on right, when looking at the scale). Notch #3 is used when measuring the base edge bevel on the other side of the ski base (on left, when looking at the scale). From either of the two outside notches the true bar will be weighted to one side or the other where, with the aid of refracted back lighting, the micro-edge may be adjusted so that it is deemed to be parallel with the face of the base edge. When this parallel condition is developed, where these lines on the carrier base intersect with the lineal scale on the true bar, a measurement of bevel degree is then read.

Adjustment of the true bar micro-edge is accomplished as follows. As the true bar with degree markings moves up or down with the adjusting knob, it causes the scale to intersect at different places on the red vertical lines on the carrier base behind. When the true bar is parallel with the face of the base edge of the ski, a reading of degrees is taken where the red line and scale intersect (degree estimates may be taken between ¼° marks.)

Reading and Evaluating the Line of Light

Figure 7A:
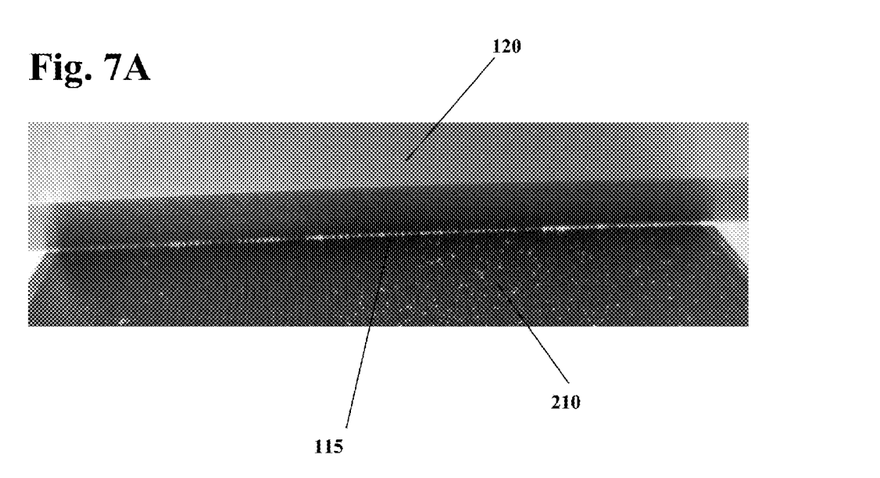
FIG. 7A shows a "line of light" (LOL) under the true bar on the opposite side from edge to edge of a ski or snowboard in accordance with the invention.
Figure 7B:
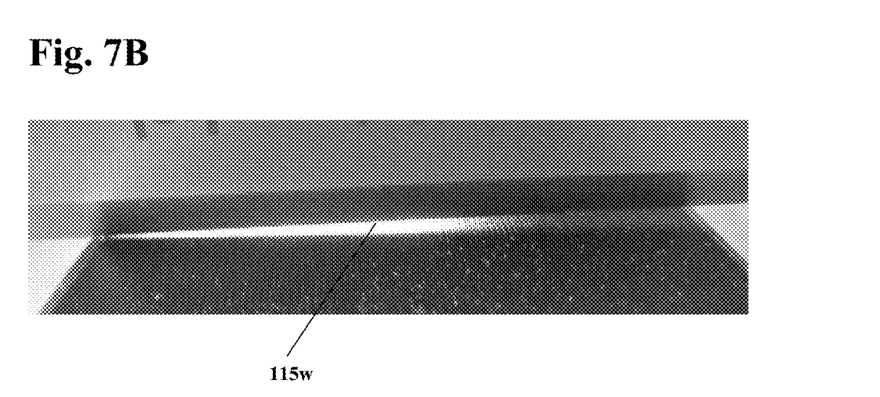
FIG. 7B shows a wedge of light demonstrated on a ski that is ground flat in accordance with the invention.
Figure 7C:
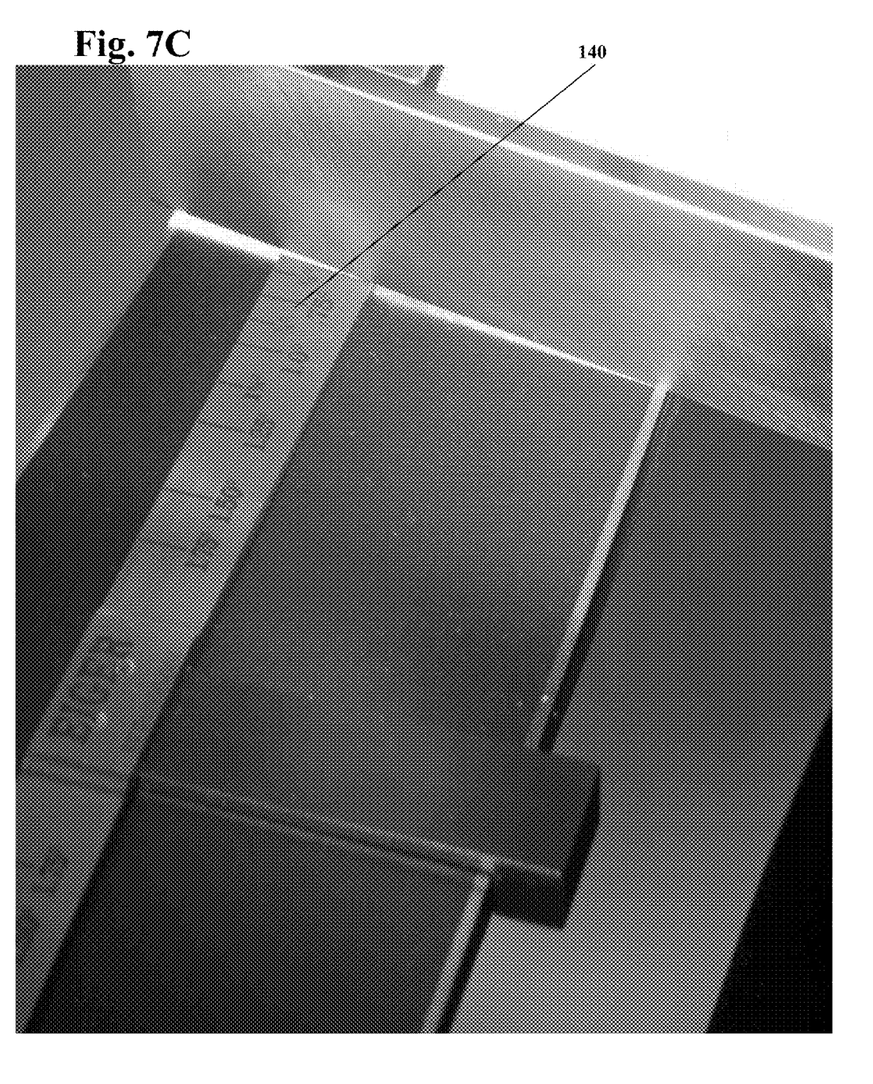
FIG. 7C shows the contact point of a precision edge bevel gauge and a true bar, and the resulting wedge of light produced in accordance with the invention.
Figure 7D:
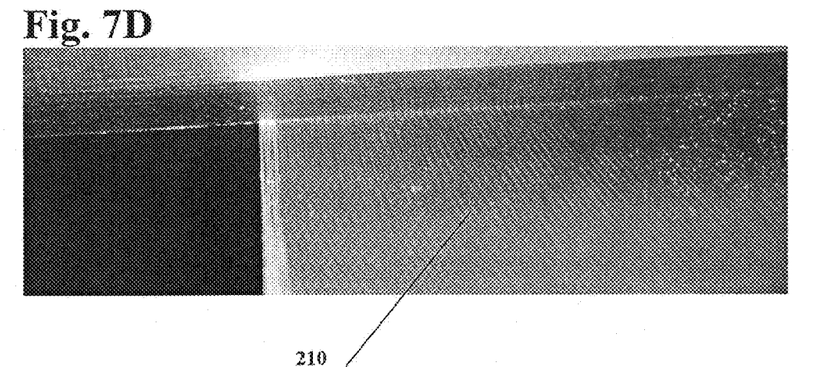
FIG. 7D shows a structured base wherein the structure of the grind carried into the edge of the ski.

Referring now to FIGS. 7A-7D, the user of the system begins by resting the micro-edge of a true bar 720 on the base 210 of a ski or board, perpendicular to its length, and backlighting one side of the true bar. A "line of light" (LOL) 115 can be seen under the true bar on the opposite side from edge to edge. See FIG. 7A, showing the line of light 115 edge to edge. (This figure shows a flat grind and the light at the edge is the same dimension as the light along the base. Note that no bevel has been created.) Upon lifting one end of the true bar (using the tool carrier) so that the micro-edge of the true bar is effectively parallel with the base face of the edge itself, the line of light 115 appears as a wedge 115w or triangle in shape, and creates a visible gap. See FIG. 7B, showing a wedge of light 115w on a ski that has been ground flat. By sliding a feeler gauge or shim 140 at a set distance from the edge being measured, under or into the gap between the base and true bar until the scale contacts the micro-edge of the true bar, and at the point where contact is made, one can read the value in degrees from the scale and record this value on the profile sheet histogram. See FIG. 7C, showing the contact point of the true bar, and the resulting wedge of light. A machine-structured base (depending on the "dress" of the stone) may appear striated, as shown in FIG. 7D. Note that the structure of this grind carried into the edge. This is before a bevel has been set.

By applying the tools and concepts described herein and observing magnified images at different points between the tip and tail of the ski or board, imperfections in the flatness from edge to edge are illustrated. Where there is more or less light between the ski or board base, micro-edge measurements as little as 0.0001 can be made, using a fractional feeler gauge or thickness shims. For example, when more precise measurements are needed (e.g. under 0.25 degrees). By sliding shims between the base and the micro-edge of the true bar, base flatness can be quantified. For example, concave or convex conditions of the plastic base at the shovel and tail can be 0.001 inch to 0.004 inch or 5 thousands of an inch and not affect the equipment performance, as long as there is some flat base at the edge. Thus uneven grinds can be detected and base burn or abrasion can be evaluated using the methods and apparatus disclosed herein.

Observations of Base and Edge Bevel

Figure 8:
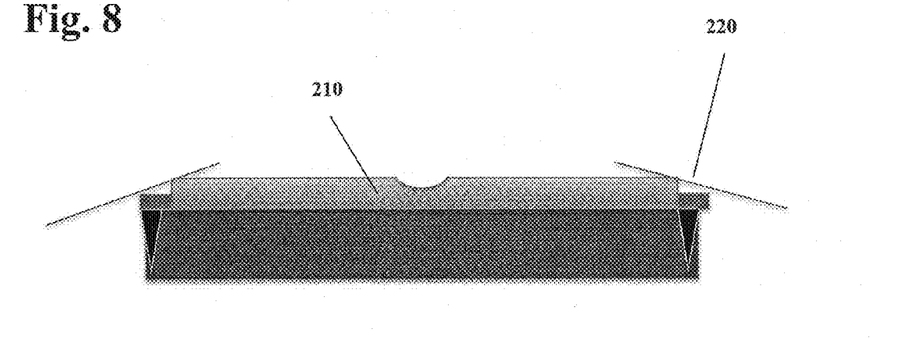
FIG. 8 shows a base edge bevel of a ski or snowboard.

FIG. 8 shows a schematic representation of a ski, showing a base edge bevel 220 that was common in the 1950s. Measurements taken from older snow skis made in the 1950s and 1960s suggest, somewhat surprisingly, that there was the notion of bevel in early ski designs. The well-known trick of wrapping a file with masking tape actually worked, up to a point, by raising the file at one end to achieve a bevel angle cut. It provides a consistent dimension (once wrapped), but is somewhat inconsistent in application. When the tape-wrapped file is placed on the base of the ski, the distance of the tape from the edge would vary and thus, inconsistently guiding on the side of the ski or the "side edge".

Early developers of file guides became aware of this and used trigonometry to make more reliable guides, and the math worked. These guides were (and still are) highly accurate and afford even the most inexperienced technician a high degree of accuracy and precision. However, they should always be used only with new, sharp cutting tools (e.g., files, diamond surfaces, stones). Files will over-cut very easily and measurements should be taken after successive passes. Coarse diamond surfaces also over-cut easily and different grades of files, diamond grits and stone grits cut at different rates. It is helpful to think of the process as honing the base edge, rather than cutting it. Do not press hard on any cutting tool in any guide. One can easily go beyond 1 degree in setting a base bevel with a 1° guide and ruin the grind, requiring regrinding flat and resetting the base edge bevel.

Measuring Base Flatness

The base flatness of a ski or board initially is established at the factory, depending on the adjustments of factory machines and settings, and materials used in the manufacturing. Each time a grind or any base flattening treatment is performed on a base, flatness is reestablished relative to a number of factors, including: each ski service shops' equipment and settings, technician experience, technicians' knowledge of individual abilities and whether recreational or high performance is the intended use. With each use of the equipment on the hill, parts of the base wear differently, requiring additional grinds and tunes by technicians. Causes of wear on bases can include any combination of debris and dirt in the snow or ice, whether new or old snow, temperature, skier/rider speed, friction and centrifugal force (pressure). Effects of wear on the bases can cause conditions of base burn or abrasion (called railing) and oxidation, base abrasion at the edge, metal edge wear and plastic base surface wear. Because the surface hardness of the plastic base and metal edges wear and change differently with use and tuning, regular attention and tuning are needed to keep equipment in condition.

Figure 9:
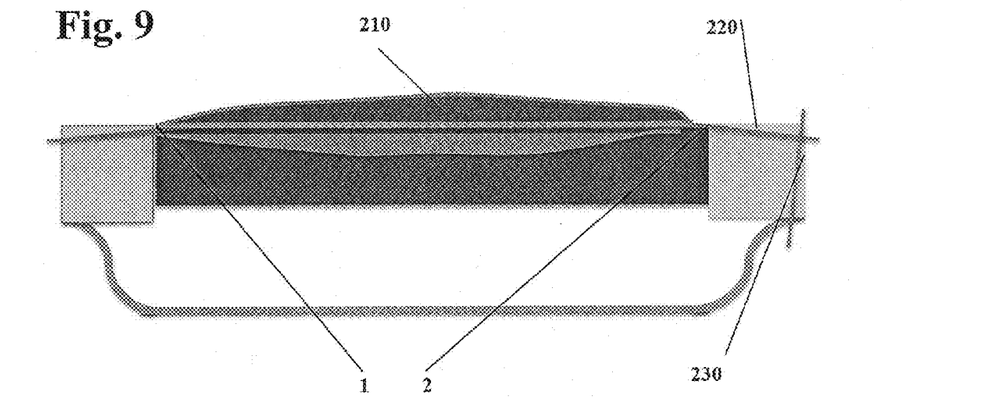
FIG. 9 shows a technique for measuring base flatness of a ski or snowboard in accordance with the invention.

Referring now to FIG. 9, the junction of the base 210 and edge at points 1 and 2 in the diagram are the least likely to change dramatically from wear and use. These are therefore the most stable points from which to measure "flatness". Since these points change the least with normal wear and tuning, they are the best reference for measuring flatness before and after each grind. Measurements with feeler gauges are used at these reference points in conjunction with a micro straightedge true bar. The base edge bevel 220 normally changes with use and/or tuning and the side edge bevel 230 normally changes with tuning Based on the inventor's measurements, the base bevel and side edges normally change with use (by +/−5%) or by tuning (+/−95%, depending on technician). In a normal racing season or for recreational use, base edge beveling once or twice per season typically is adequate.

Measuring and Establishing a Tolerance

Figure 10:
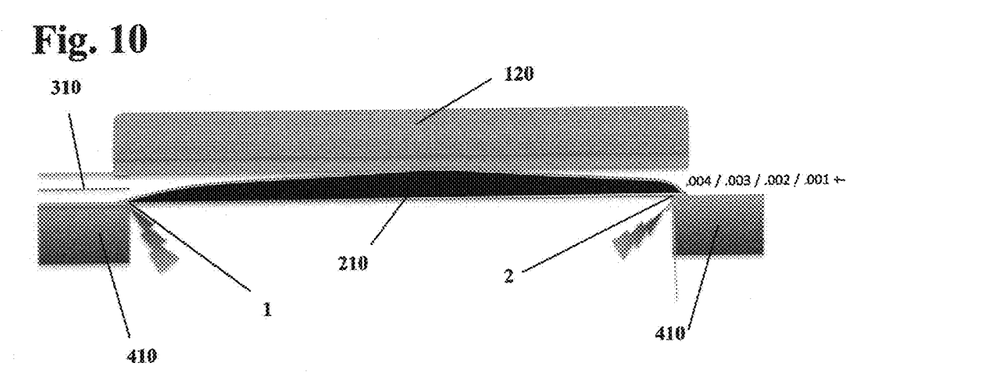
FIG. 10 shows a technique for measuring and establishing a tolerance for flatness of a ski or snowboard in accordance with the invention.

FIG. 10 illustrates a method for measuring and establishing a tolerance for flatness on a ski with a base that is convex. The junction between the edges 410 and the base 210 at points 1 and 2 are the best reference points at which to insert feeler gauges 310 to measure differences (convex or concave surfaces) in the plastic base height. Place the true bar 720 at the center of the ski. This is effectively accomplished by using the tool carrier to hold the true bar micro-edge perpendicular to the base. Using the tool carrier, back light, mirror and magnifier, visually equalize the light seen at points 1 and 2. The true bar will tend to rock one way or the other. Shims of equal thickness are placed at points 1 and 2, being careful not to alter the position of the straightedge on the surface of the base, until both sets of shims touch. Equalize the light seen at each point and guide the feeler gauges between the base and the true bar to measure each value at points 1 and 2.

After measuring several points for flatness on the base, in the areas such as at the tip, mid section and tail, one gets a feel for what machine and or hand tuning has accomplished in terms of: dressing the stone, cutting tools, machine adjustments of speed, pressure and operator or machine guidance system. Different segments of the base can be tuned differently. Snowboards are wider than skis and take a different touch or feel, but the concepts are the same for both skis and snowboards. Using any suitable tool guide or gauge for example, on a plastic base that is either high or low by not less than 0.004 inch will change the performance or result of that guide or cutting tool by about ⅕ of a degree.

Generally, anything more than a 0.003-0.004 inch difference is needed to call for correction or regrind to the surface of the plastic base.

Measuring Side Edge Thickness

Figure 11:
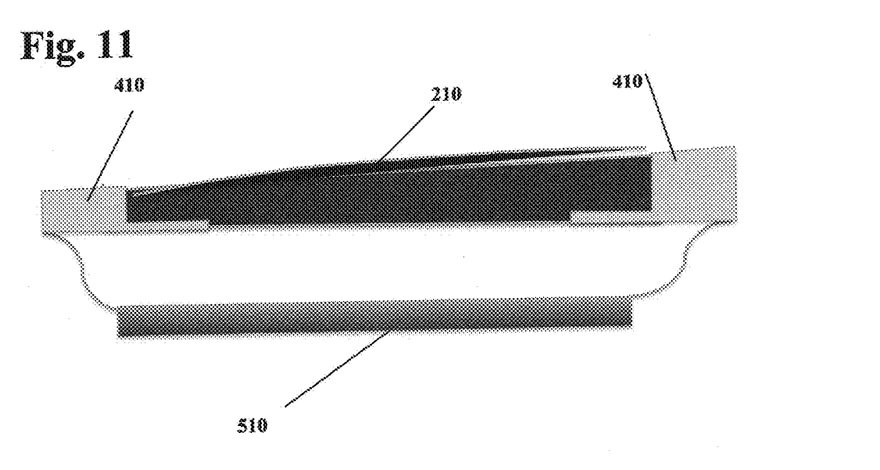
FIG. 11 shows side edge thickness and demonstrates a potential problem wherein the binding surface is not parallel with the base of the ski or board.

FIG. 11 illustrates another important method to check a flat grind on a ski or board by measuring side edge thickness. The general assumption is that the factory has built a board or ski with symmetry and accurate parallel characteristics between the base surface and the binding surface. In fact, factories can deliver very different products that require technicians and ski service shops to work to flatten and correct for parallel symmetry. Both flattening and structuring may be done together or done separately, depending on the equipment and technician skills. Machines at ski service shops may also cause the undesirable conditions. The tools needed to measure the side edge include a rule graduated in ¹⁄₆₄ths of an inch or a vernier depth gauge and a magnifier. This test shows how square the ski is being held against a stone for grinding a flat base and finishing with a structure. If the tolerance is to be within 0.1 (one tenth) of a degree of flat and if either edge differs in thickness from the opposite side by more than $\frac{1}{10}^{th}$ of a degree, then it is a flag to alert the technician or tuner that the stone wheel may not be dressed squarely, the machine bearings might be worn, the platen may need adjustment, or the bridge (if used) is not square. All of these elements need to be adjusted to achieve accurate, consistent squareness.

Figure 12A:
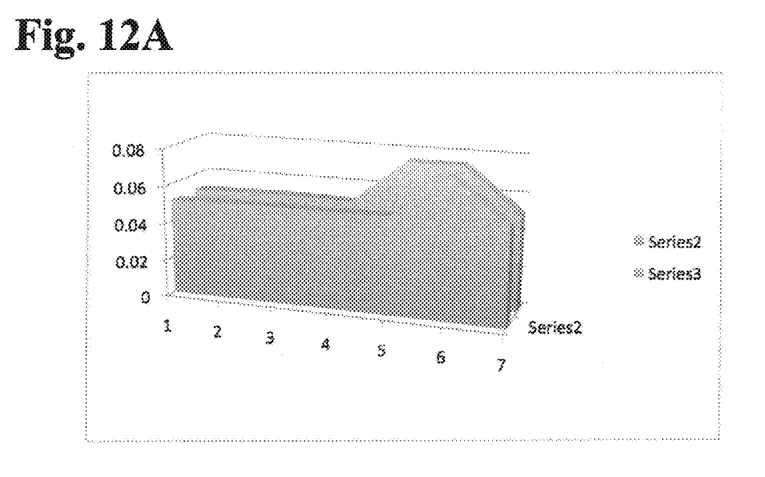
FIGS. 12A and 12B show graphs of side edge thickness of a pair of skis with respect to flatness.
Figure 12B:
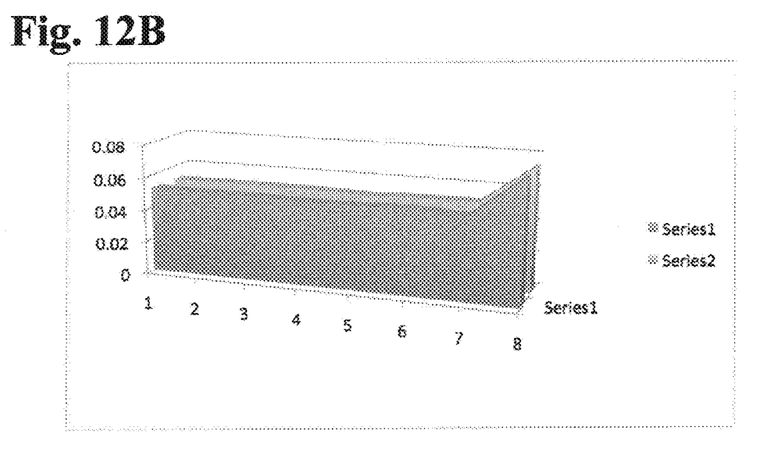

The image depicted in FIG. 11 was derived from actual measurements taken of the side edge material at 20 cm intervals. Note that one side is thicker than the other and the binding surface 510 is not parallel with the base 210. This is an illustration of a bad condition that is often the result of machine pressure or other factors of machine-grinding and poor manufacturing. The graphs in FIGS. 12A and 12B show that the side edge material is thicker by about 20 to 40 centimeters from each of the tails. However, both sides at the tails are close to equal (left 0.075; right 0.052). Many machines cannot easily sense the torsional flex or stiffness of a ski and pressure changes where ski or boards are thinner. This is where operator experience may make an adjustment like redressing the stone or adjusting the equipment for pressure of the grind and or speed of the grind. Stones also have different characteristics that should be considered.

Measuring and Calculating Edge Bevel

Figure 13:
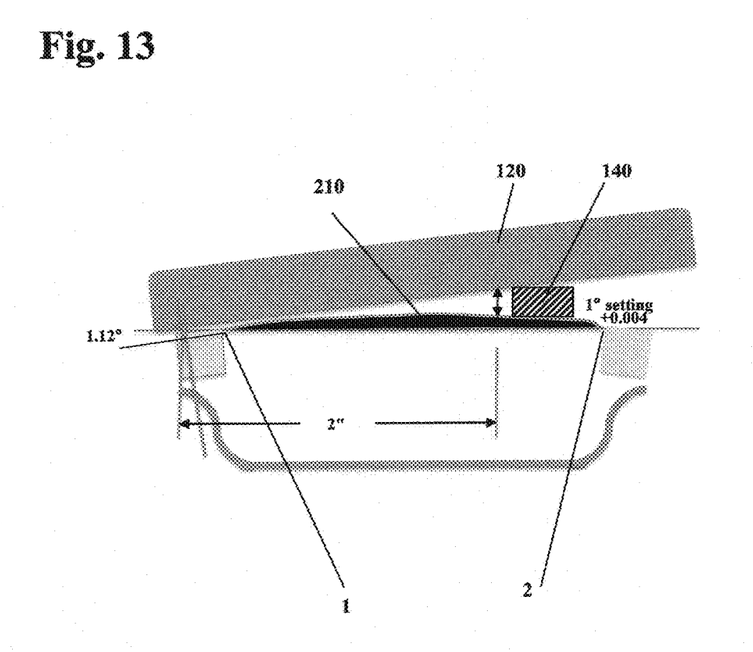
FIG. 13 shows a technique for measuring edge bevel of a ski or snowboard with a precision edge bevel gauge in accordance with the invention.

FIG. 13 illustrates a technique for measuring edge bevel of a ski or snowboard with a precision edge bevel gauge. Using the tool carrier to precisely raise and lower one end of the true bar micro-edge and allowing the true bar to pivot on one edge, the contact between these two metal surfaces allows light to be shielded, but allows some refracted light through and where there is no light, the two surfaces are parallel or matching the beveled edge. At any distance out on the base surface (adjacent side) and at a 90-degree angle joining the micro-edge, a right triangle is formed. With the true bar now in a set position, a measurement is taken of the opposite side with the edge bevel gauge at a known distance from the edge (adjacent side). With these two values known, the bevel angle is calculated.

FIG. 13 shows an example of the "base high" condition at 2 inches. Any gauge, cutting tool or guide that rides on the base is thus affected by a value plus or minus from flat. Measurements are in thousands of an inch. Thus, if the base topography raises the tool/guide away from "flat" by 0.005 inch and a one degree guide or gauge is used on that surface, the resulting bevel angle achieved will be one and one fifteenth degree (1 1/15°). For example, a base high or a low of 0.005, will cause n 14%+ or – swing in the potential accuracy. Most file guides as well as the apparatus disclosed herein use a formula value of 2" for the base, which is just a convenient dimension that keeps the tool or gauge on the base. The formula for measuring the base edge bevel angle is: tangent (angle "theta")=opposite side/adjacent side.

Base Conditions: Burn, Oxidation and Railing

Railing is a condition wherein the bases next to the metal edge develop a groove-like condition that makes equipment perform unpredictably. Oxidation occurs, when equipment is not waxed and sits for a long time or equipment is used for periods without re-waxing, causing the base material to develop a whitish color. Railing is caused by excessive wear from hard snow, ice, speed and force, wherein points 1 and 2 become exposed, creating grooves in the base next to the edge, resulting in sideways resistance and making skis unpredictable. In this condition, edge and base surfaces are not smoothly matched and a fresh grind is needed that will create new reference points at 1 and 2, at which point flatness should be measured again to confirm the desired results.

The above-described system for accurately measuring and tuning the base and edge bevel of a ski or snowboard for increased performance provides a cost effective and efficient manner of evaluating skis and snowboards. While preferred embodiments and methods have been described in detail, various modifications, alterations, and changes may be made without departing from the spirit and scope of the present invention as defined in the appended claims. Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. Apparatus for measuring flatness and base edge bevel of a snow ski or snowboard base, comprising:

a true bar with a durable, straight, micro-edge for contacting said ski or snowboard base;

means for adjusting and holding said true bar micro-edge in contact with said ski or snowboard;

a light source on one side of said true bar for illuminating said ski or snowboard base and said true bar micro-edge when contacting said base; and viewing means on a side of said true bar opposite said light source for viewing light from said source passing between said true bar micro-edge and said ski or snowboard base.

2. The apparatus of claim 1, wherein said light source comprises one or more light emitting diodes, a flashlight or other hand-held light, any lamp, sunlight or ambient light.

3. The apparatus of claim 1, wherein said viewing means comprises a magnifier and/or a reflector.

4. The apparatus of claim 1, wherein said means for adjusting and holding said true bar comprises a precision edge bevel gauge assembly that includes:

a tool carrier base plate for holding said true bar in contact with said ski or snowboard base;

a clamp assembly affixed to said carrier base plate for reversibly securing said edge bevel gauge assembly to said ski or snowboard base;

a shoulder pin affixed to said carrier base plate, on which said true bar pivots; and a securing knob for adjustably securing said true bar to said shoulder pin.

5. The apparatus of claim 4, wherein said light source comprises one or more light emitting diodes, a flashlight or other hand-held light, any lamp, sunlight or ambient light.

6. The apparatus of claim 4, wherein said viewing means comprises a magnifier and/or a reflector.

7. The apparatus of claim 4, wherein said true bar comprises:

multiple positioning notches at an upper end of said true bar, wherein each notch is a pivot point of said true bar;

a pair of viewing slots arranged near a center area of said true bar; and a fractional angle scale adjacent to an inside edge of each slot.

8. The apparatus of claim 7, wherein said carrier base plate comprises a pair of vertical lines arranged such that they can be viewed through said viewing slots in said true bar.

9. The apparatus of claim 8, wherein said light source comprises one or more light emitting diodes, a flashlight or other hand-held light, any lamp, sunlight or ambient light.

10. The apparatus of claim 8, wherein said viewing means comprises a magnifier and/or a reflector.

11. The apparatus of claim 10, wherein said light source comprises one or more light emitting diodes, a flashlight or other hand-held light, any lamp, sunlight or ambient light.

12. A method for measuring the edge bevel of a snow ski or snowboard base, comprising the steps of:

securing apparatus in accordance with claim 8 to said ski or snowboard base;

adjusting said true bar micro-edge to be substantially parallel with a face of said ski or snowboard base edge;

when such parallel condition is achieved, reading a measurement of bevel angle degrees at a point where said vertical lines on said carrier base intersect with said fractional angle scale on said true bar.

13. The method of claim 12, further comprising the steps of:

taking successive measurements at multiple points on said base; and recording said measurements to create a map of said base conditions.

14. A method for measuring the edge bevel of a snow ski or snowboard base, comprising the steps of:
  securing apparatus in accordance with claim 11 to said ski or snowboard base;
  adjusting said true bar micro-edge to be substantially parallel with a face of said ski or snowboard base edge;
  when such parallel condition is achieved, reading a measurement of bevel angle degrees at a point where said vertical lines on said carrier base intersect with said fractional angle scale on said true bar.

15. The method of claim 14, further comprising the steps of:
  taking successive measurements at multiple points on said base; and
  recording said measurements to create a map of said base conditions.

\* \* \* \* \*